(12) United States Patent
Hopkins et al.

(10) Patent No.: US 11,275,054 B2
(45) Date of Patent: Mar. 15, 2022

(54) ION MOBILITY SPECTROMETER AND METHOD OF ANALYZING IONS

(71) Applicant: JP Scientific Limited, Waterloo (CA)

(72) Inventors: Scott Hopkins, Waterloo (CA); Janusz B. Pawliszyn, Waterloo (CA)

(73) Assignee: JP SCIENTIFIC LIMITED, Waterloo (CA)

( * ) Notice: Subject to any disclaimer, the term of this patent is extended or adjusted under 35 U.S.C. 154(b) by 0 days.

(21) Appl. No.: 16/969,358

(22) PCT Filed: Feb. 13, 2019

(86) PCT No.: PCT/CA2019/050180
§ 371 (c)(1),
(2) Date: Aug. 12, 2020

(87) PCT Pub. No.: WO2019/157596
PCT Pub. Date: Aug. 22, 2019

(65) Prior Publication Data
US 2021/0048411 A1 Feb. 18, 2021

Related U.S. Application Data

(60) Provisional application No. 62/629,763, filed on Feb. 13, 2018.

(51) Int. Cl.
*G01N 27/622* (2021.01)

(52) U.S. Cl.
CPC ................... *G01N 27/622* (2013.01)

(58) Field of Classification Search
CPC ........ G01N 27/622; H01J 49/00; H01J 49/02; H01J 49/06; H01J 49/062; H01J 49/066; H01J 49/065

(Continued)

(56) References Cited

U.S. PATENT DOCUMENTS

| 5,759,370 A | 6/1998 | Pawliszyn |
| 5,847,386 A | 12/1998 | Thomson et al. |

(Continued)

FOREIGN PATENT DOCUMENTS

| CA | 2829828 A1 | 9/2012 |
| EP | 1963835 A1 | 9/2008 |

(Continued)

OTHER PUBLICATIONS

Buryakov et al., "A New Method of Separation of Multi-Atomic Ions by Mobility at Atmospheric Pressure Using a High-frequency Amplitude-Asymmetric Strong Electric Field," International Journal of Mass Spectrometry and Ion Processes, 1993, vol. 128, pp. 143-148.

(Continued)

*Primary Examiner* — Jason L McCormack
(74) *Attorney, Agent, or Firm* — Borden Ladner Gervais LLP; Louis B. Allard

(57) ABSTRACT

An ion mass spectrometer that has an ion channel shaped to modify the speed of a carrier gas as the carrier gas traverses the ion channel. In one case, the ion channel has segments of constant diameter in which the speed of the flowing gas is constant but different than the speed in other segments of the ion channel. This controlled variation in speed from segment to segment, together with the control of the axial electric field in the ion channel, provide greater control on the separation of ions in the ion channel. A method of analyzing ions based on a variation of at least one of axial electric field and of the speed of the flowing gas in the ion channel is also disclosed.

19 Claims, 17 Drawing Sheets

(58) Field of Classification Search
USPC .......................................... 250/281, 282, 290
See application file for complete search history.

(56) References Cited

U.S. PATENT DOCUMENTS

| | | | |
|---|---|---|---|
| 6,107,628 | A | 8/2000 | Smith et al. |
| 6,630,662 | B1 | 10/2003 | Loboda |
| 7,714,278 | B2 | 5/2010 | Boyle et al. |
| 7,838,826 | B1 | 11/2010 | Park |
| 8,410,432 | B2 | 4/2013 | Miller et al. |
| 2003/0213903 | A1 | 11/2003 | Ichimura et al. |
| 2011/0121170 | A1* | 5/2011 | Park ...................... H01J 49/066 250/282 |
| 2012/0273674 | A1 | 11/2012 | Park et al. |
| 2016/0126083 | A1* | 5/2016 | Hoyes ................... H01J 49/062 250/282 |
| 2016/0181080 | A1* | 6/2016 | Williams ............... H01J 49/062 250/292 |

FOREIGN PATENT DOCUMENTS

| | | | |
|---|---|---|---|
| EP | 3252460 | A1 | 12/2017 |
| WO | 0122049 | A2 | 3/2001 |
| WO | 2007056488 | A1 | 5/2007 |

OTHER PUBLICATIONS

Fang et al., "A Model of Thermally Generated Ph Gradients in Tapered Capillaries," Analyst, 1999, vol. 124, pp. 335-341.

Fernandez-Lima et al., "Gas-Phase Separation Using a Trapped Ion Mobility Spectrometer," International Journal for Ion Mobility Spectrometry, Sep. 2011, vol. 14(2-3), 10 pages.

International Patent Application No. PCT/CA2019/050180, International Preliminary Report on Patentability and Written Opinion dated Aug. 18, 2020.

International Patent Application No. PCT/CA2019/050180, International Search Report and Written Opinion dated Apr. 10, 2019.

Page et al., "Variable Low-mass Filtering Using an Electrodynamic Ion Funnel," Journal of Mass Spectrometry, 2005, vol. 40, pp. 1215-1222.

Pawliszyn and Wu., "Ampholyte-Free Isoelectric Focusing of Proteins in Cone Shaped Capillaries," Journal of Microcolumn Separations, 1993, vol. 5(5), pp. 397-401.

Ridgeway et al., "Trends in Trapped Ion Mobility E Mass Spectrometry Instrumentation," Trends in Analytical Chemistry, 2019, vol. 116, pp. 324-331.

Shvartsburg and Smith., "Fundamentals of Traveling Wave Ion Mobility Spectrometry," Analytical Chemistry, 2008, vol. 80, pp. 9699-9699.

Wester., "Radiofrequency Multipole Traps: Tools for Spectroscopy and Dynamics of Cold Molecular Ions," Journal of Physics B: Atomic, Molecular and Optical Physics, 2009, vol. 42: 154001, 13 pages.

Zeleny., "VI. On the Ratio of the Velocities of the Two Ions Produced in Gases by Röntgen Radiation; and on Some Related Phenomena," The London, Edinburgh, and Dublin Philosophical Magazine and Journal of Science, 1898, vol. 46(278), pp. 120-154.

European Patent Application No. 19754561.9, Extended European Search Report dated Oct. 25, 2021.

* cited by examiner

ION MOBILITY SPECTROMETER AND METHOD OF ANALYZING IONS

CROSS REFERENCE TO RELATED APPLICATIONS

This application claims the benefit of priority of U.S. Provisional Patent Application No. 62/629,763, filed Feb. 13, 2018, which is incorporated herein by reference in its entirety.

FIELD OF THE INVENTION

The present disclosure relates to ion mobility spectrometry in general and to trapped ion mobility spectrometry in particular. More particularly, the present disclosure relates to an ion mobility spectrometer and to a method of analyzing ions.

BACKGROUND OF THE INVENTION

Ion mobility spectrometry is a technique used to separate and identify ionized molecules in the gas phase based on their mobility in a flowing carrier gas. There exist a number of variants to this method including, trapped ion mobility spectrometry in which a radio frequency (RF) electric field radially confines (traps) ions in an ion channel while a flowing carrier gas forces (drags) ions along the ion channel while simultaneously, an electric field exerts an electric force on the ions, in a direction opposite the direction followed by the flowing carrier gas. The competing drag and electric forces act to separate the ions as a function of their mass to charge ratio and as a function of their collisional cross-section.

Trapped ion mobility spectrometry remains limited with respect to controlling the linear velocity (speed) of the carrier gas in the ion channel, the effectiveness of the RF field in radially confining the ions along the center of the ion channel, and the control of the electric field along the ion channel.

Therefore, improvements in ion mobility spectrometry are desirable.

SUMMARY OF THE DISCLOSURE

In a first aspect, the present invention provides an ion mobility spectrometer that comprises an ion mobility analyzer, which has: a body defining an ion channel extending therethrough, the ion channel being continuous, the ion channel having a diameter that varies monotonically along the ion channel, the ion channel having an input section and an output section. The ion mobility analyzer further has: electrodes set in the body, along the ion channel and around the ion channel, the electrodes being arranged to receive an adjustable DC electrical signal and an adjustable time-varying electrical signal, the adjustable DC electrical signal to generate an electric field along the ion channel, the time-varying electrical signal to generate a confining field to confine ions in the ion channel along a central portion of the ion channel, the central portion extending parallel to the ion channel. Additionally, the ion mobility analyzer has: an entrance guide coupled to the input section of the ion channel, the entrance guide configured to guide ions to the ion channel. Furthermore, the ion mobility analyzer has an exit guide coupled to the output section of the ion channel, the exit guide to guide ions exiting the analyzer out of the ion mobility spectrometer. According to this aspect, the body can be made of an electrically insulating material. Further, also according to this aspect, the ion mobility spectrometer can also comprise an electrical signal source coupled to the electrodes, the electrical signal source being configured to generate, in distinct linear segments of the ion channel, distinct DC electric fields.

In a second aspect, the present disclosure provides an ion mobility spectrometer that comprises: an analyzer, the analyzer having: a body made of a conductive material, the solid body defining an ion channel extending therethrough, the ion channel being continuous, the ion channel having a diameter that varies monotonically along the ion channel, the ion channel having an input section at a first end of the body and an output section at a second end of the body, the conductive material being configured to generate a confining field to confine ions in the ion channel along a central portion of the ion channel, the central portion extending parallel to the ion channel, the first end of the body and the second end of the body being configured to receive a DC voltage to generate an electric field in the ion channel. The analyzer further has electrodes set in the body along the ion channel and around the ion channel, the electrodes being arranged to receive an adjustable time-varying electrical signal, the time-varying electrical signal to generate a confining field to confine ions in the ion channel along a central portion of the ion channel, the central portion extending parallel to the ion channel, the electrodes being electrically isolated from the body. The ion mobility further comprises an entrance guide coupled to the input section of the ion channel, the entrance guide configured to guide ions to the ion channel; and an exit guide coupled to the output section of the ion channel, the exit guide to guide ions exiting the analyzer out of the ion mobility spectrometer.

In relation to first and second aspects of the present disclosure:

In some embodiments, the electrodes protrude in the ion channel. In other embodiments, the electrodes are flush with a wall of the ion channel.

In some embodiments, the diameter of the ion channel decreases continuously from the input section to the output section. In some cases, the ion channel diameter decreases linearly from the input section to the output section. In other cases, the diameter of the ion channel decreases quadratically from the input section to the output section. In yet other cases, the diameter of the ion channel decreases quadratically from the input section to the output section.

In other embodiments, the diameter of the ion channel decreases continuously from the output section to the input section. In some cases, the ion channel diameter decreases linearly from the output section to the input section. In other cases, the diameter of the ion channel decreases quadratically from the output section to the input section. In yet other cases, the diameter of the ion channel decreases quadratically from the output section to the input section.

In certain embodiments, the ion channel includes a plurality of segments each having a respective constant diameter different from the diameter of the other segments of the plurality of segments. In these embodiments, the ion channel includes one or more than one transition section, each segment of the plurality of segments is spaced apart from another segment of the plurality of segments by a respective one of the one or more than one transition section. In some cases, each transition section of the one or more than one transition section has a length parallel to the ion channel and a diameter that varies along the length of respective transition section.

In some embodiments, the ion mobility analyzer is such that the electrodes are perpendicular to the ion channel and are radially aligned with the ion channel. The electrodes can comprise groups of electrodes, each group of electrodes being in a respective plane that is perpendicular to the ion channel, each group of electrodes being spaced apart from the other groups of electrodes, along the ion channel. Each group of electrodes can consists of an even number of electrodes. The even number can be six or twelve.

The entrance guide can be an entrance funnel and, the exit guide can be an exit funnel.

The time-varying electrical signal can be a radio frequency (RF) electrical signal. The RF electrical signal can be a multipole RF signal.

The entrance guide can be configured to receive a flowing carrier gas and to provide the flowing carrier gas to the ion channel; and the monotonically varying diameter of the ion channel is configured to vary a speed of the flowing carrier gas as the flowing carrier gas traverses the ion channel. The ion spectrometer of the present disclosure can further comprise a source of carrier gas providing the flowing carrier gas. The source of carrier gas can be a source of reagent carrier gas. Or, the ion mobility spectrometer can include a source of reagent compound that provides the reagent compound for mixing with the flowing carrier gas.

The body of the analyzer can be a monolithic body or a composite body.

In third aspect, the present invention provides a method of analyzing ions, the method comprises: providing a flowing carrier gas to an ion channel, the ion channel having an input section and an output section, the flowing carrier gas is input at the input section, the flowing carrier gas containing the ions, the ion channel having a plurality of segments parallel to the ion channel, a speed of the flowing carrier gas being constant within each segment, the speed of the flowing carrier gas in a particular segment being different than the speed of the flowing carrier gas in any other segment, the speed of the flowing carrier gas changing monotonically along the ion channel, the flowing carrier gas generating a drag force on the ions, the drag force depending on the speed of the flowing carrier gas. The method further comprises: generating an electric field in the ion channel to produce an electric force acting on the ions, the electric force being in a direction opposite the direction of the drag force, the different speed of the flowing carrier gas in each segment of the ion channel and the electric force resulting is a separation of the ions along the ion channel. Additionally, the method comprises varying at least one of an amplitude of the electric field and the speed of the carrier gas in each segment of the ion channel to eject ions from the output section of the ion channel. In some embodiments, the method also comprises generating a time-varying electric field in the ion channel to confine the ions to a central region of the ion channel. Additionally, the method can comprise accumulating ions in the ion channel prior to varying at least one of an amplitude of the electric field and the speed of the carrier gas in each segment of the ion channel. The method can further comprise providing ejected ions to an ion characterization device such as, for example, a mass spectrometer. In further embodiments, the speed of the flowing carrier gas is greater in a segment of the plurality of segments closest to the output section than the speed of the flowing carrier gas in a segment of the plurality of segments closest to the input section. Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures.

DETAILED DESCRIPTION

Generally, the present invention provides an ion mass spectrometer that has an ion channel shaped to modify the speed of a carrier gas as the carrier gas traverses the ion channel. In one case, the ion channel has segments of constant diameter in which the speed of the flowing gas is constant but different than the speed in other segments of the ion channel. This controlled variation in speed from segment to segment, together with the control of the axial electric field in the ion channel, together provide greater control on the separation of ions in the ion channel. Within the context of the present disclosure, the expression "linear velocity" is to be understood as meaning "linear speed" or simply "speed".

Figure 1:
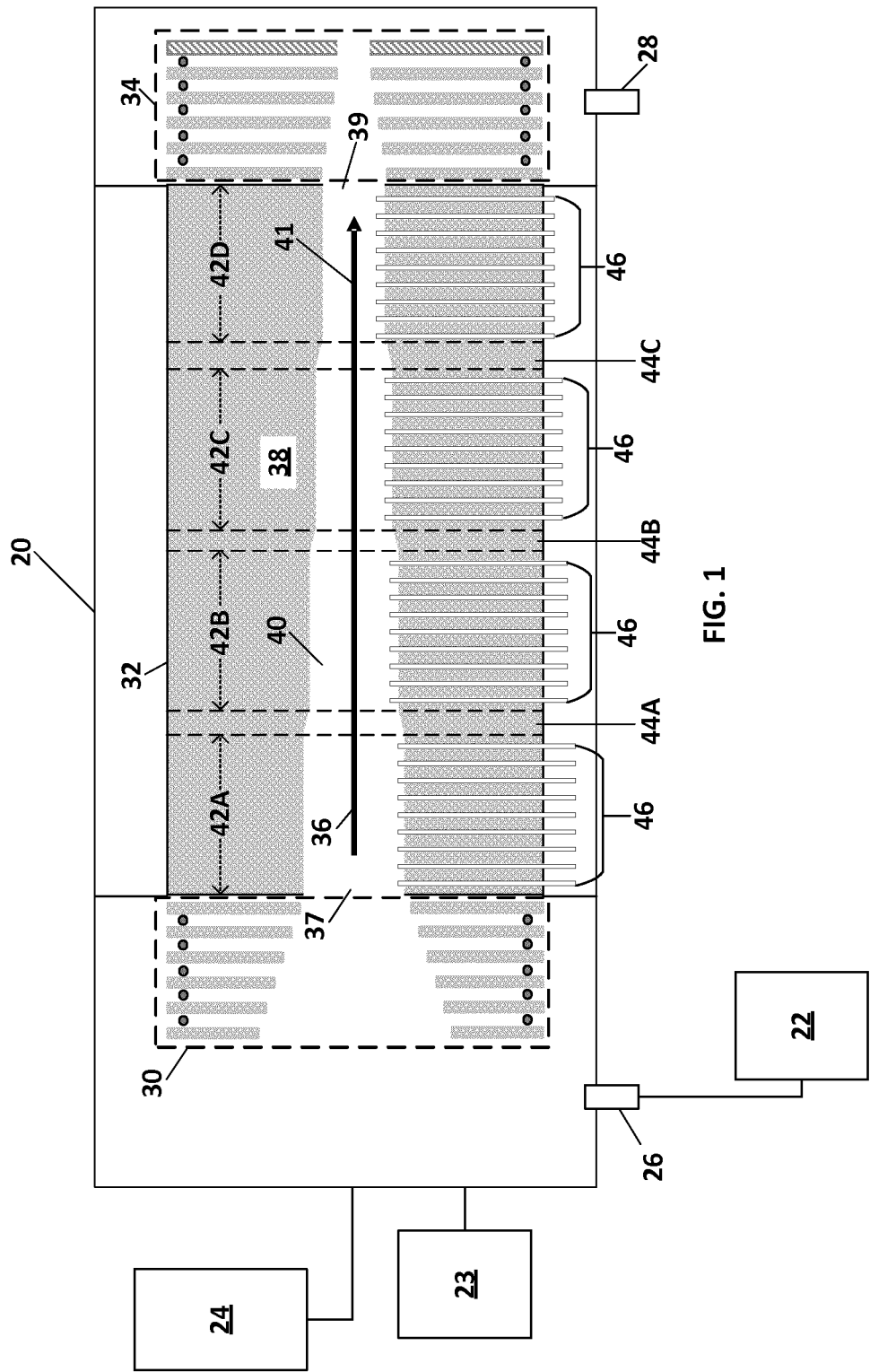
FIG. 1 shows a side, cross-sectional view of an embodiment of an ion mobility spectrometer (IMS) in accordance with the present disclosure.

FIG. 1 shows a side, cross-sectional view of an embodiment of an ion mobility spectrometer (IMS) 20 in accordance with the present disclosure. The IMS 20 is connected to an ion source 24 that provides ions to be analyzed to the IMS 20. Any suitable type of ion source can be used without departing from the scope of the present disclosure. For example, an electrospray ionization source can be used. Other types of ion sources include: a laser ablation ion source, a sputtering ion source, a discharge ion source, an inductively coupled plasma ion source, a matrix-assisted laser desorption/ionization ion source, etc.

The IMS 20 has an entrance guide 30, which is configured to guide the ions provided by the ion source 24 to an analyzer 32. The analyzer 32 is coupled to an exit guide 34, which is configured to output the ions analyzed by the analyzer 32 outside the IMS 20. The ions output from the exit guide 34 can be provided or coupled to, for example, a mass spectrometer, a Faraday cage, an electron multiplier, a photomultiplier, etc.

In the analyzer 32 of the present embodiment, the analyzer 32 has a body 38, made of an electrically insulating material that defines an ion channel 40, which extends through the body 38 from an input section 37 to an output section 39. The ion channel 40 has a diameter that, rather than being constant along the entire length of the ion channel 40, varies monotonically along the ion channel 40. In this example, the analyzer 32 has four segments 42A, 42B, 42C and 42D that each has a constant diameter different than the diameter of the other segments. Separating the segments 42A, 42B, 42C and 42D from each other are transition sections 44A, 44B and 44C, which each have a diameter that varies along the length the respective transition section.

Then analyzer can be of any suitable dimensions. For example, in some embodiments, the length of the analyzer can be about 120 mm. The length of the segments 42A, 42B, 42C and 42D can be 28 mm each, the length of transition sections 44A, 44B and 44C can be 2 mm each, and the width can be 34 mm. The diameter of segments 42A, 42B, 42C and 42D can be 14 mm, 12 mm, 10 mm and 8 mm respectively. In other embodiments, the IMS 20 can be miniature IMS fabricated using 3D printing. In other embodiments, the analyzer can be manufactured using 3D printing technology. In such embodiments, the analyzer can be manufactured as a body out of a poorly conductive material, so that an application of a potential difference (voltage) between the ends of the analyzer generates a DC electric field along the ion channel defined by the body. Examples of such poorly conductive materials include carbon, metal-loaded plastics, nanoparticles composites, etc. In such embodiments, the electrodes set in the body 38 are electrically isolated from the body 38 by, for example, providing an insulating material between the electrodes and the body.

Figure 2:
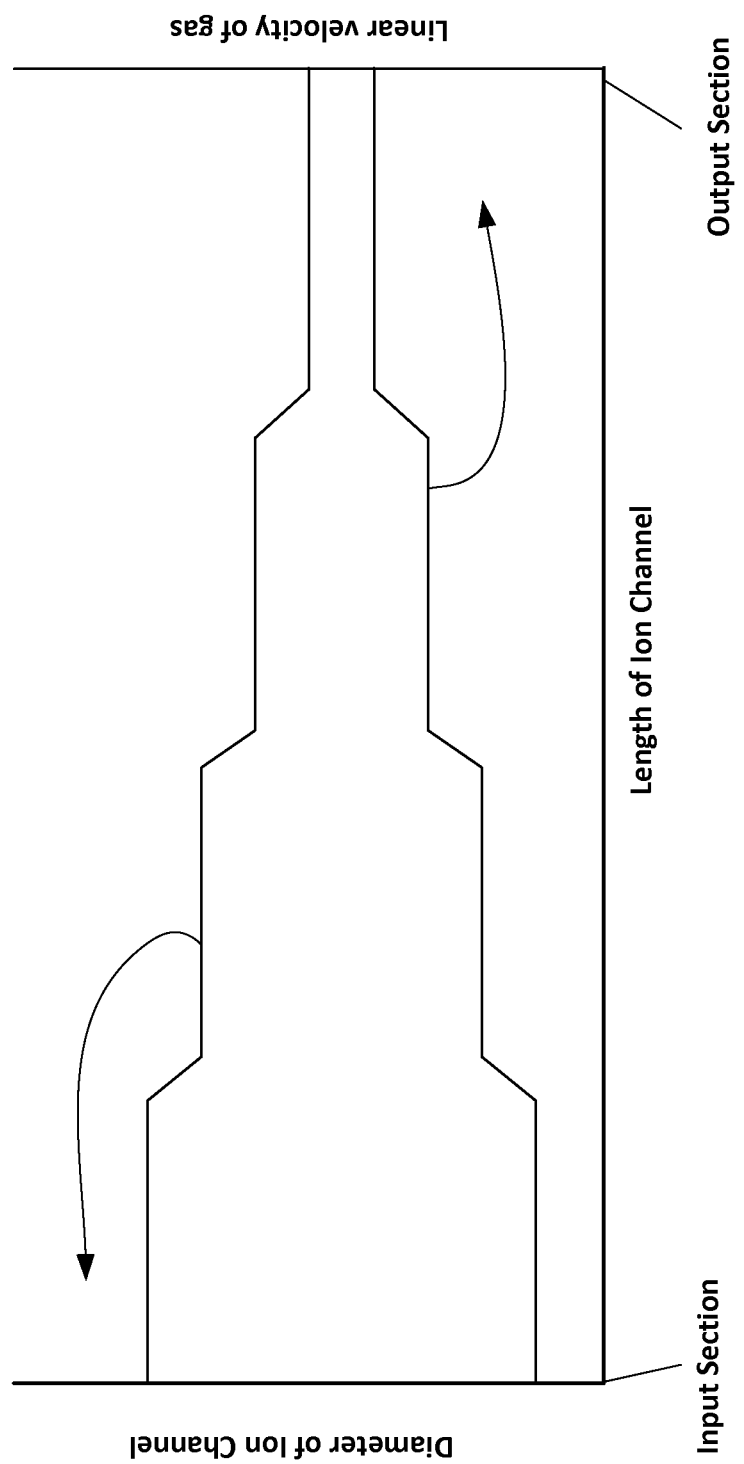
FIG. 2 shows a plot of the diameter of the ion channel of the IMS of FIG. 1, as a function of the length of the ion channel.

FIG. 2 shows an example of a plot of the diameter of the ion channel 40 as a function of the length of the ion channel 40. In every lengthwise portion of the ion channel, the diameter is either constant or decreasing, which is akin to a monotonic decreasing function. As such, the ion channel 40 has a diameter that varies monotonically along the ion channel 40. FIG. 2 also show a plot of the linear velocity of the flowing gas in each segment of the ion channel.

Returning to FIG. 1, the IMS 20 has a carrier gas inlet 26 and a carrier gas outlet 28. The carrier gas inlet in coupled to a carrier gas source 22. The pressure at the carrier gas inlet 26 is greater than the pressure at the carrier gas outlet 28. This difference in pressure causes the carrier gas to flow through the ion entrance guide 30, the ion channel 40 and the ion exit guide 34, in the direction indicated by the arrow 36. The analyzer 32 further includes electrodes 46, which are discussed in detail further below. In general, the carrier gas can be un-reactive (for example, nitrogen, argon, etc.). However, any suitable carrier gas can be used. In some embodiments, reagent gases can be used to cause a chemical transformation of the ions being analyzed. In cases where dissimilar ions have the same mass to charge ratio and are difficult to differentiate, adding a reagent gas can result in modified ions that have different mobilities and that are more easily distinguishable than the pre-reaction ions. The reagent gas can include any suitable carrier gas to which reagent compounds are added. In some cases, the carrier gas can be reagent in itself. In other cases, the carrier gas can be water vapor, methanol, acetonitrile, etc. As will be understood by the skilled worker, the carrier gas, reagent gas and reagent compounds can be selected in accordance with the particular chemical properties of the ions being analyzed. In cases where the carrier gas is not by itself a reagent gas, reagent compounds can be added to the carrier gas in any suitable way. For example, reagent compounds can be added to the carrier gas source 22. Alternatively, the reagent compound can be provided by the ion source 24 in order to mix with the carrier gas prior to the gas traversing the ion channel 40. In other cases, a reagent compound source 23 can be coupled to IMS 20 and configured to provide reagent compounds to the IMS 20 in order for the reagent compounds to mix with the carrier gas prior to the gas traversing the ion channel 40.

In order to have a laminar flow of the carrier gas in the ion channel 40, and to minimize/avoid any turbulent flow of the carrier gas, the transition regions 44A, 44B and 44C are slopped from one segment to the next. The shape of the slope can be linear, as shown in FIG. 1, or can be curved. For example, the curve in the transition region can be similar to that of one side of a de Laval nozzle such that the thermal energy of the gas is more efficiently converted into kinetic energy along the flow axis. A sigmoidal curve or similar embodiment could also be an option.

Figure 3:
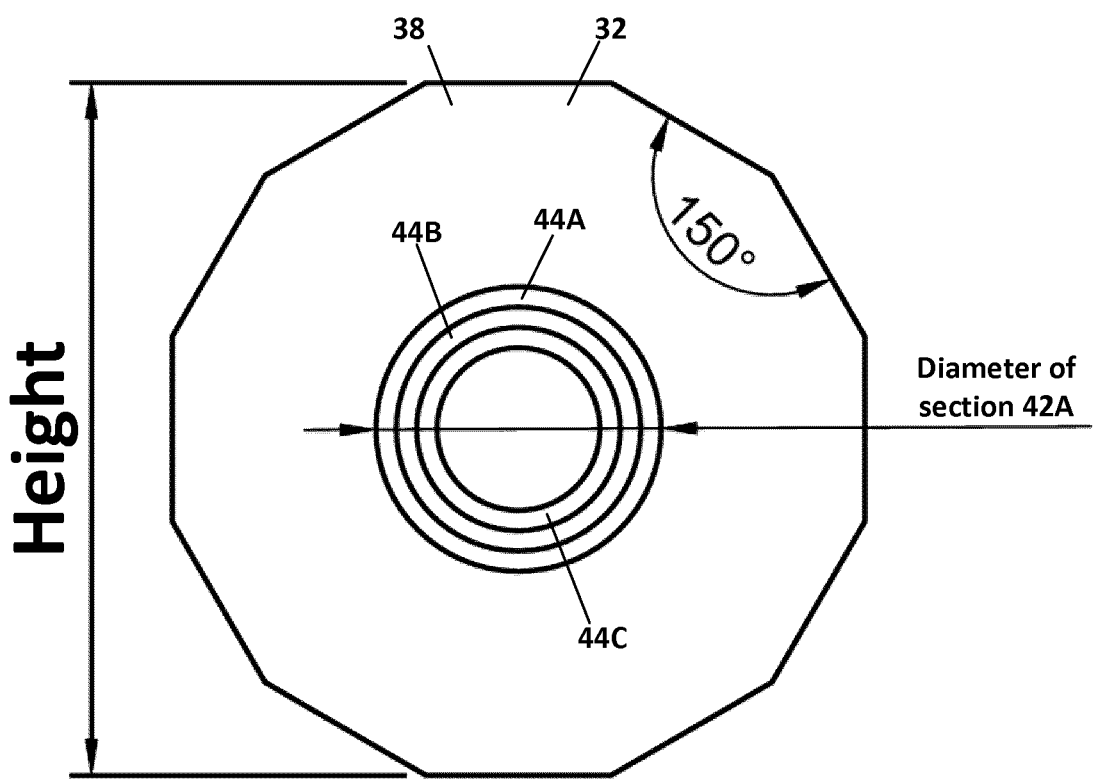
FIG. 3 shows an end view of the body of the IMS of FIG. 1, taken from the input section side.

FIG. 3 shows an end view of the body 38, taken from the input section side 37. The transition sections 44A, 44B and 44C are shown in the figure. The cross-section shown in FIG. 3 is perpendicular to the ion channel 40 and is, in the present example, dodecagonal. However, any suitable cross-section is to be considered within the scope of the present disclosure. For example, instead of a dodecagonal cross-section, the body 38 can have, perpendicular to the ion channel 40, a circular cross-section, a square cross-section, a hexagonal cross-section, etc. The electrodes 46 are not shown in FIG. 3.

Returning to FIG. 1, as the segments 42A, 42B, 42C and 42D have decreasing diameters, the speed at which the carrier gas traverses the segments 42A, 42B, 42C and 42D of the ion channel 40 will increase from one segment to the next. Any ion in the ion channel 40 will consequently move faster as it passes from one segment of the ion channel 40 to the next. Because of the moving carrier gas, any ion present in the ion channel 40 will be subjected to a drag force that increases as the speed (linear velocity) of the carrier gas increases.

To counteract the drag force exerted by the carrier gas on the ions present in the ion channel 40, the analyzer 32 has electrodes 46 set in the body 38. These electrodes are used to generate an electric field inside the ion channel 40. The electric field is to exert an electric force on the ions in the ion channel 40, in a direction parallel to the ion channel 40. The electric field is such that the electric force pushes the ions in the direction opposed to the direction in which the carrier gas flows in the ion channel 40.

The electrodes 46 are set along the ion channel 40 and around the ion channel 40. For clarity purposes, FIG. 1 shows electrodes 46 set only at the lower part of the ion channel.

Figure 4:
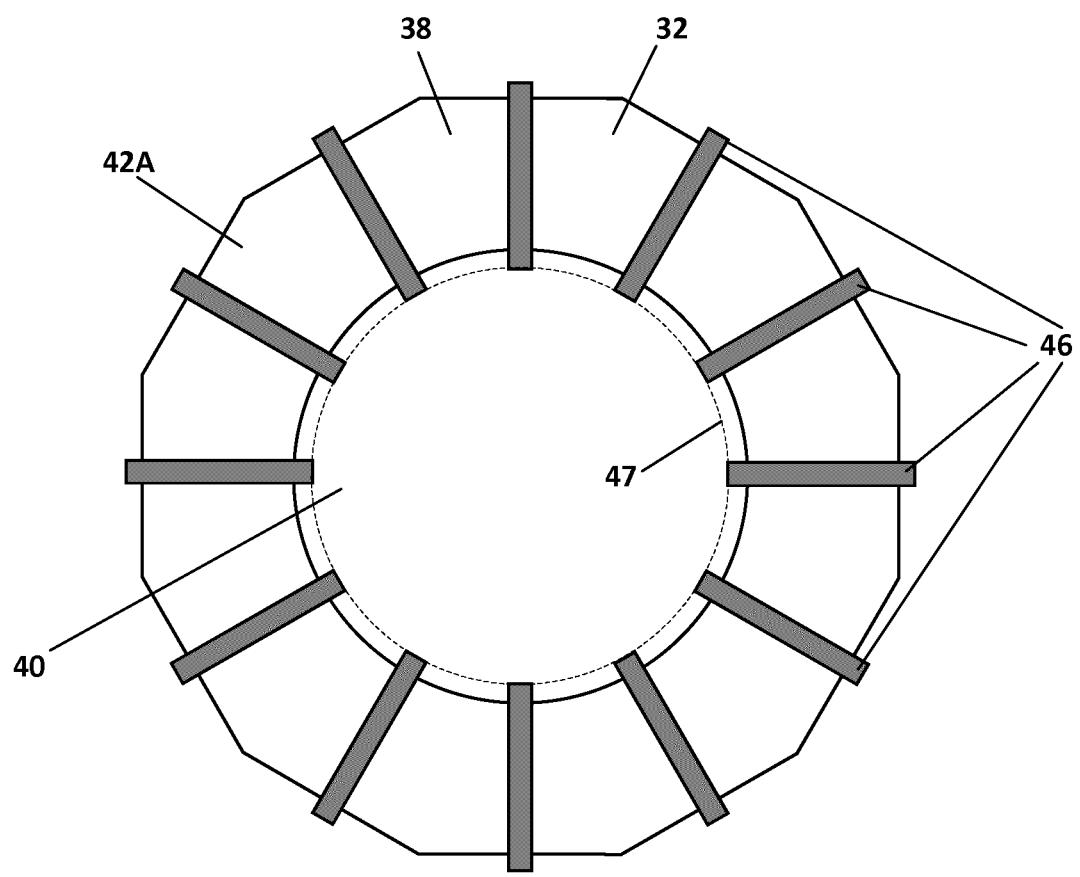
FIG. 4 shows a cross-section of the analyzer of the IMS of FIG. 1 with a group of electrodes set in the body 38.

FIG. 4 shows a cross-section of the analyzer 32 with a group of electrodes 46 set in the body 38, in segment 42A. In this embodiment, the twelve electrodes 46 of the group are radially aligned with to the ion channel 40 and are all in a same plane, which is perpendicular to the ion channel 40. Further, the electrodes 46 are angularly equi-spaced around the diameter of the ion channel 40. As will be understood by the skilled worker, analyzers that have a different number of electrodes or in which the electrodes are arranged differently than in the embodiment of FIG. 4 are to be considered within the scope of the present disclosure. As shown in this figure, the protruding electrodes define a circle 47 that has a diameter smaller than the diameter of the segment 42A.

Figure 5:
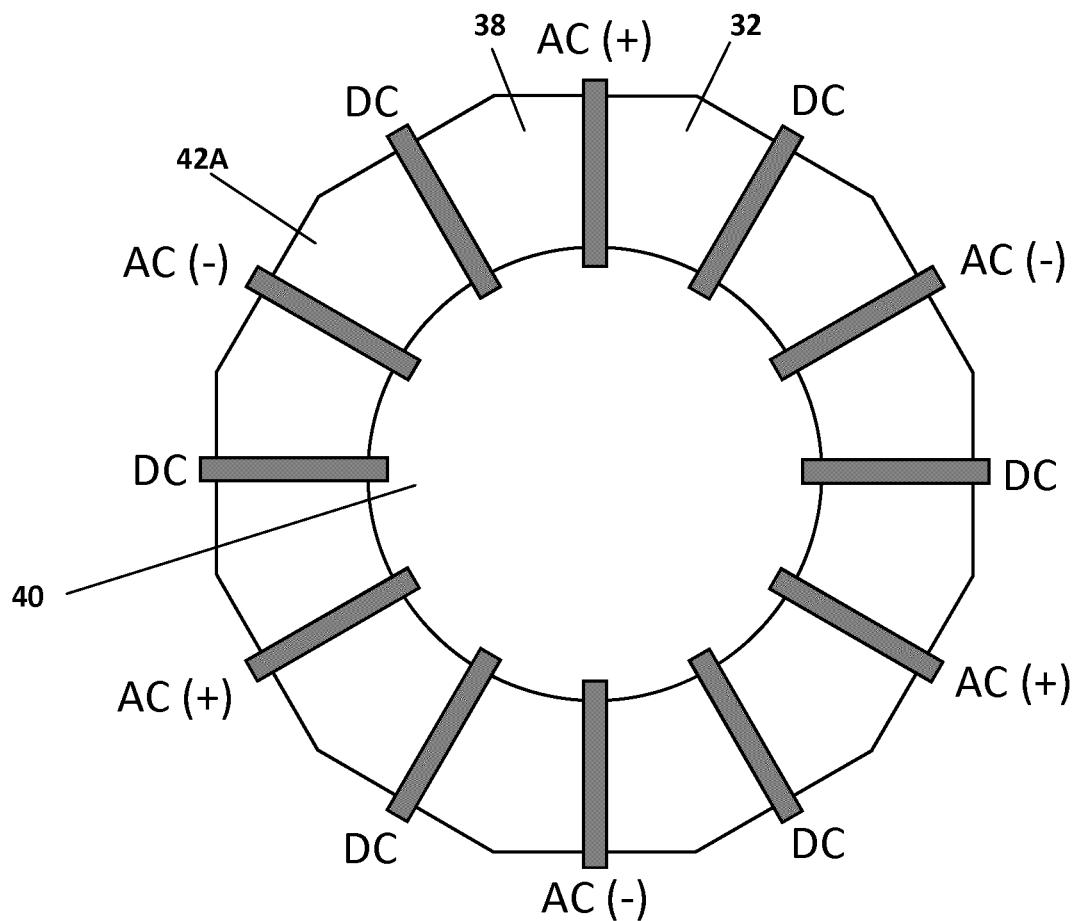
FIG. 5 shows the same cross-section of the analyzer as in FIG. 4, but with indications of where, on the group of electrodes, a DC electrical signal can be provided and where a time-varying electrical signal can be provided.
Figure 6:
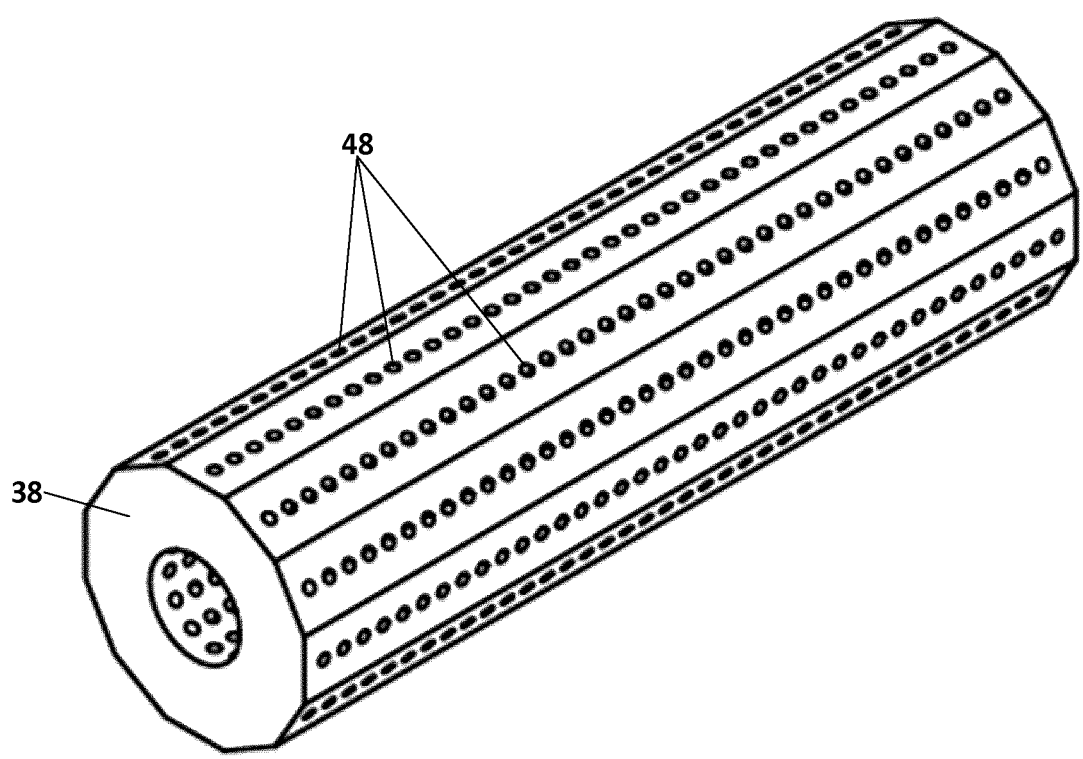
FIG. 6 shows a top perspective view of the body of the IMS of FIG. 1, with the apertures in which electrodes can be set.

FIG. 5 shows the same cross-section of the analyzer 32 as in FIG. 4, but with indications of where, on the group of electrodes, a DC electrical signal can be provided and where a time-varying electrical signal (e.g. AC(−) and AC(+)) can be provided. FIG. 6 shows a top perspective view of the body 38, with apertures 48. The electrodes 46 are configured to be set in the apertures 48 of the body 38.

Figure 7:
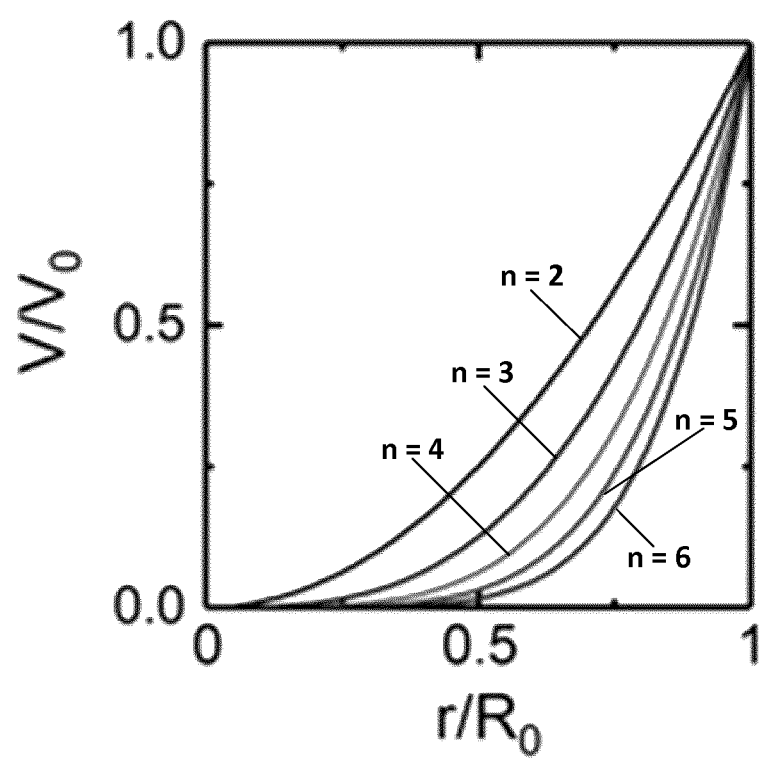
FIG. 7 shows the radial dependence of a multipole filed for different orders of multipoles.

In the present example, when electrodes 46 are set in in the apertures 48 of the body 38 of FIG. 6, all the electrodes aligned with each other and with the ion channel 40 are subjected to the same electrical signal, which is the DC electrical signal or the time-varying electrical signal. When the time-varying electrical signal is an ideal two-dimensional multipole radio frequency (RF) electrical signal, the signal (V) can be expressed, in polar coordinates, as:

$$V(r, \phi, t) = V_0 \cos(n\phi)\left(\frac{r}{R_0}\right)^n \sin(\omega t)$$

Where $V_0$ is the RF amplitude, $R_0$ is the inscribed radius of the RF electrodes, and $\omega$ denotes the angular frequency. $V_0$ can have a value of a few hundreds of volts; in some embodiments, $V_0$ will not exceed 300 volts. $R_0$ can be of the order of 1 MHz or, as will be understood by the skilled worker, depending of the configuration of the analyzer, can have any other suitable value. "r" is the radial coordinate and "φ" is the angular coordinate. As will be understood by the skilled worker, in practice, the RF signal is created by 2n electrodes (i.e., for a quadrupolar field n=2, for a hexapolar field n=3, and so on). The radial dependence of the above described electric potential is plotted in FIG. 7. With increasing n, the confining RF field remains flatter and closer to zero further from the ion channel center axis. In other words, by increasing n, ions can occupy a larger near-zero field region near the ion channel center axis. This increases the relative number of ions which can be loaded into the analyzer and decreases space-charging effects which might limit mobility resolution.

In segments of the analyzer 32, there can be groups of twelve electrodes disposed as shown in FIG. 5. As will be understood by the skilled worker, this need not be the case. For example, if the diameter of a particular segment is sufficiently small to prevent reliably setting twelve electrodes therein, then fewer than twelve electrodes can be set. For example, six electrodes can be set instead of twelve. In other embodiments there can be more than twelve electrodes per group of electrodes.

Figure 8:
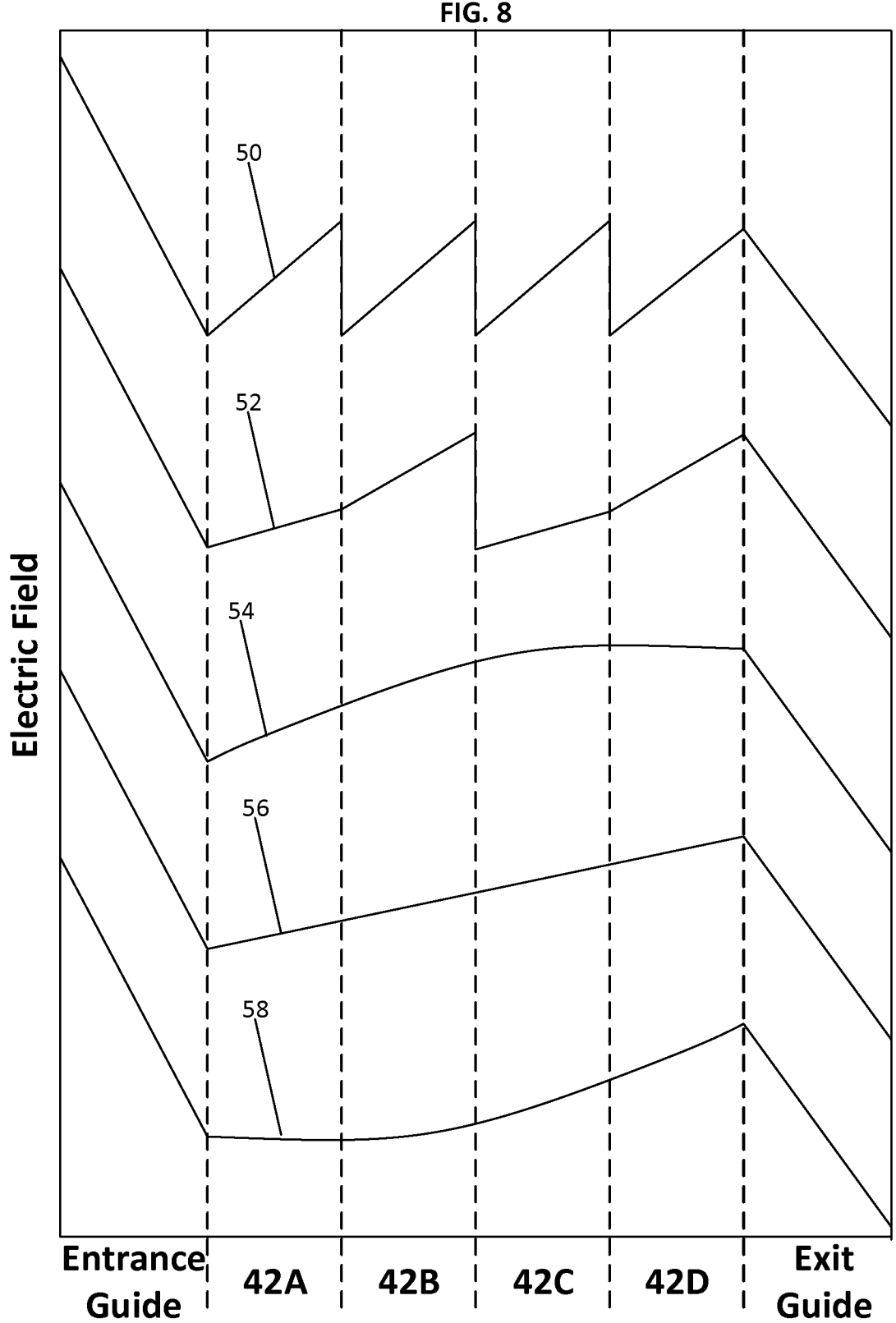
FIG. 8 shows examples of plots of electric fields that can be applied in the IMS of FIG. 1.

In the present embodiment, the DC electrical signal provided to the electrodes 46 can be different for each of the segments 42A, 42B, 42C and 42D, as shown by plot 50 in the graph of FIG. 8. This divides the analyzer 32 into four sectors which can be controlled individually. Dividing the mobility analyzer into independent sectors facilitates several new modes of operation. In the mode shown at plot 50, the analyzer 32 is employed as a series of four parallel flow ion mobility devices. This enables multiple simultaneous instances of ion separation and isolation for multiplexing measurements or for pre-concentrating analytes prior to detection (at a mass spectrometer for example). Of note, the variation of the speed along the ion channel 40 provides an additional degree of tuning of the analyzer 32.

In other modes of operation, multiple sectors can be combined and utilized as a single parallel flow device. One may then employ a linear DC ramp across several sectors while taking advantage of variation of the speed of the carrier gas in the segments 42A, 42B, 42C and 42D (see plot 56), or one can tune the voltages for the individual sectors to shape the electric field gradient across the device (e.g., approximate square root function in plot 54, or exponential function in plot 58). Further, it is possible to generate multiple shaped electric fields across the device as is shown in plot 52.

Figure 9:
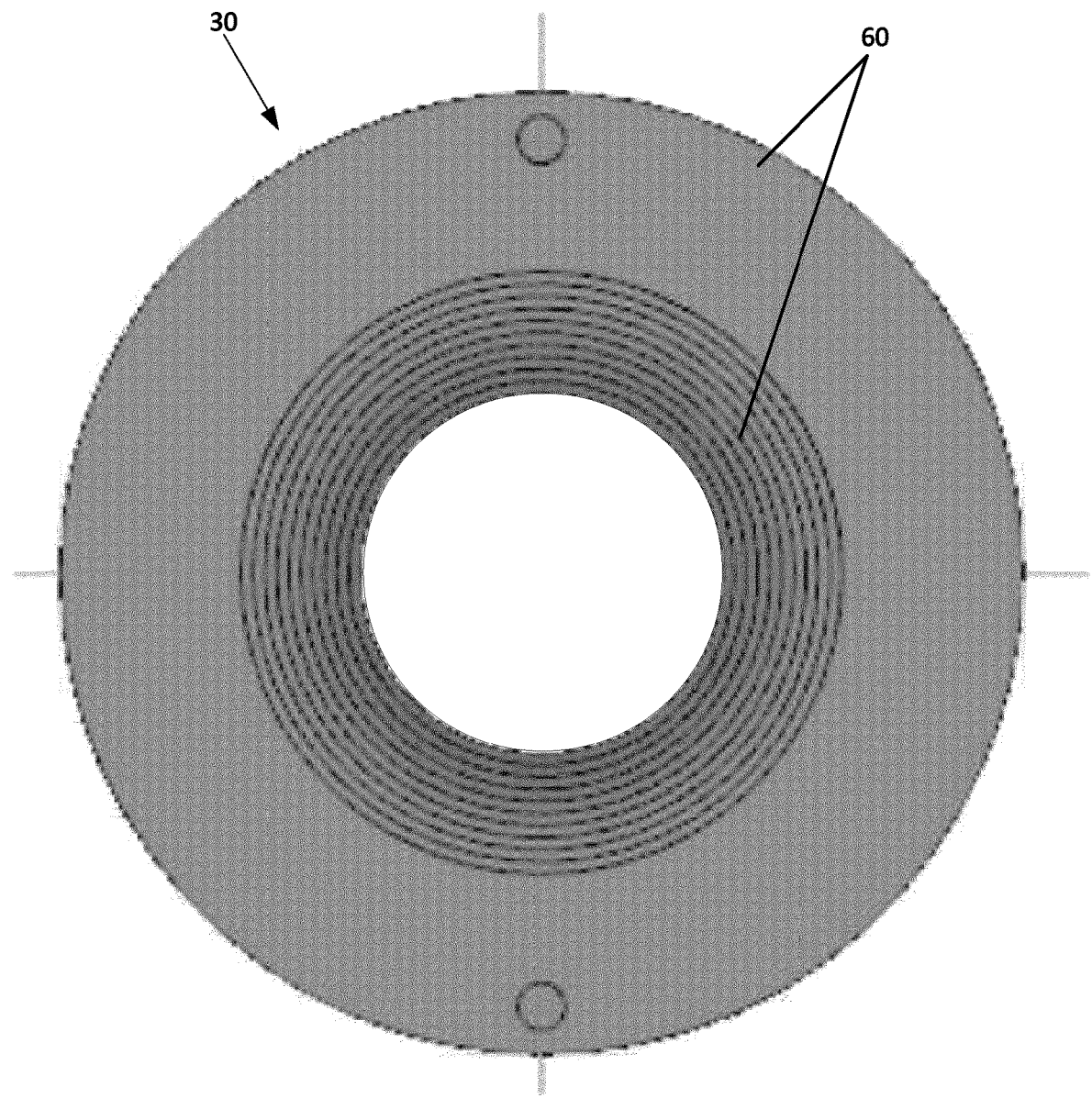
FIG. 9 shows an end view of the entrance guide of the IMS of FIG. 1.

FIG. 9 shows an end view of the entrance guide 30, which, in this embodiment, is funnel shaped. The entrance guide comprises a plurality of ring segments 60 concentrically aligned with each other, from the ring segment having the largest aperture to the ring segment having the smallest aperture. In the present embodiment, the exit guide 34 is, as the entrance guide 30, funnel shaped and looks similar to the entrance guide 30 shown in FIG. 9. The ion funnels of the entrance guide 30 and the exit guide 34 have a decreasing orifice size and decreasing applied voltage from the point where the ions enter to where they exit. There is also a dipolar RF applied between adjacent annular electrodes (i.e. longitudinal along the device axis). This acts as an ion lens, focusing ions down to a smaller cross-section at the funnel exit, resulting in higher ion transmission to the detector. The force applied by the funnel electric field is in the same direction as the gas/ion flow. Also, while the ions are radially confined in the funnel, an operator can select the mass range for confinement by tuning the voltages; when higher mass-to-charge (m/z) ratio species are selected, low m/z ion trajectories become unstable and these species are lost/ neutralized.

Within the analyzer, there is a radial RF field (not a longitudinal RF field). This confines all m/z ions efficiently. By employing higher multipolar fields (for example, hexapole, octupole, etc.), this generates a relatively large low-field volume in the center of the analyzer 34 (the analyzer can also be referred to a mobility cell). This allows loading of the mobility cell with significantly more ions than prior art mobility cells (prior art analyzers), and it mitigates the effects of field-induced heating, which can lead to ion fragmentation that has a confounding effect in molecular determination. The DC voltage applied in the mobility cell (analyzer 34) opposes the direction of ion/gas flow. This, combined with the radial confinement, traps the ions in the region where the force provided by the opposing DC field perfectly counteracts the force applied by the gas flow.

The funnel-like electrode arrangement within the mobility cell (analyzer 34) is used to ensure that the electric field gradient matches the gas flow gradient throughout the mobility cell.

Figure 10:
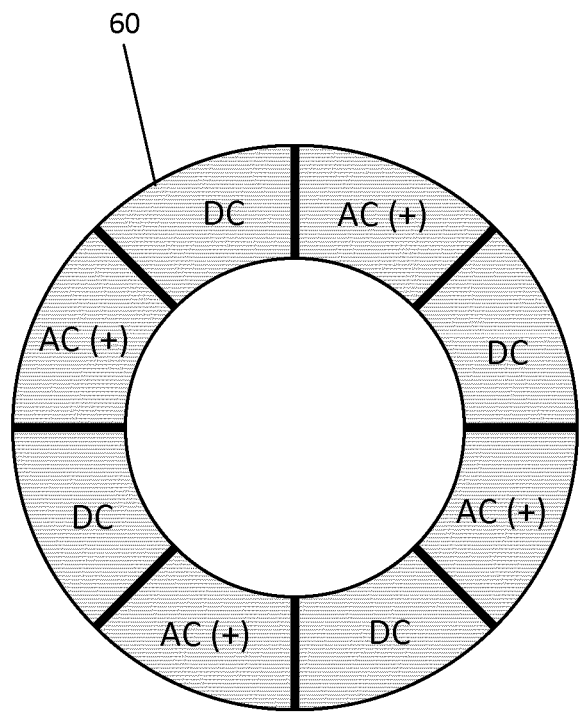
FIG. 10 shows a segment of the entrance guide of FIG. 9, divided in eight sections configured to receive either a DC electrical signal or an AC electrical signal
Figure 11:
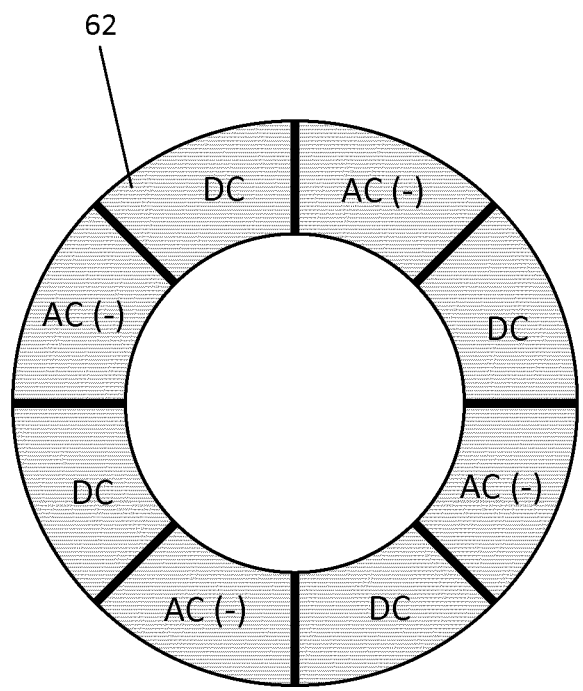
FIG. 11 shows a segment of the exit guide of the IMS of FIG. 1, divided in eight sections configured to receive either a DC electrical signal or an AC electrical signal.

FIG. 10 shows a segment 60 of the entrance guide 30 divided in eight sections configured to receive either a DC electrical signal or an AC electrical signal. FIG. 11 shows a segment 62 of the exit guide 30 divided in eight sections configured to receive either a DC electrical signal or an AC electrical signal.

Figure 12:
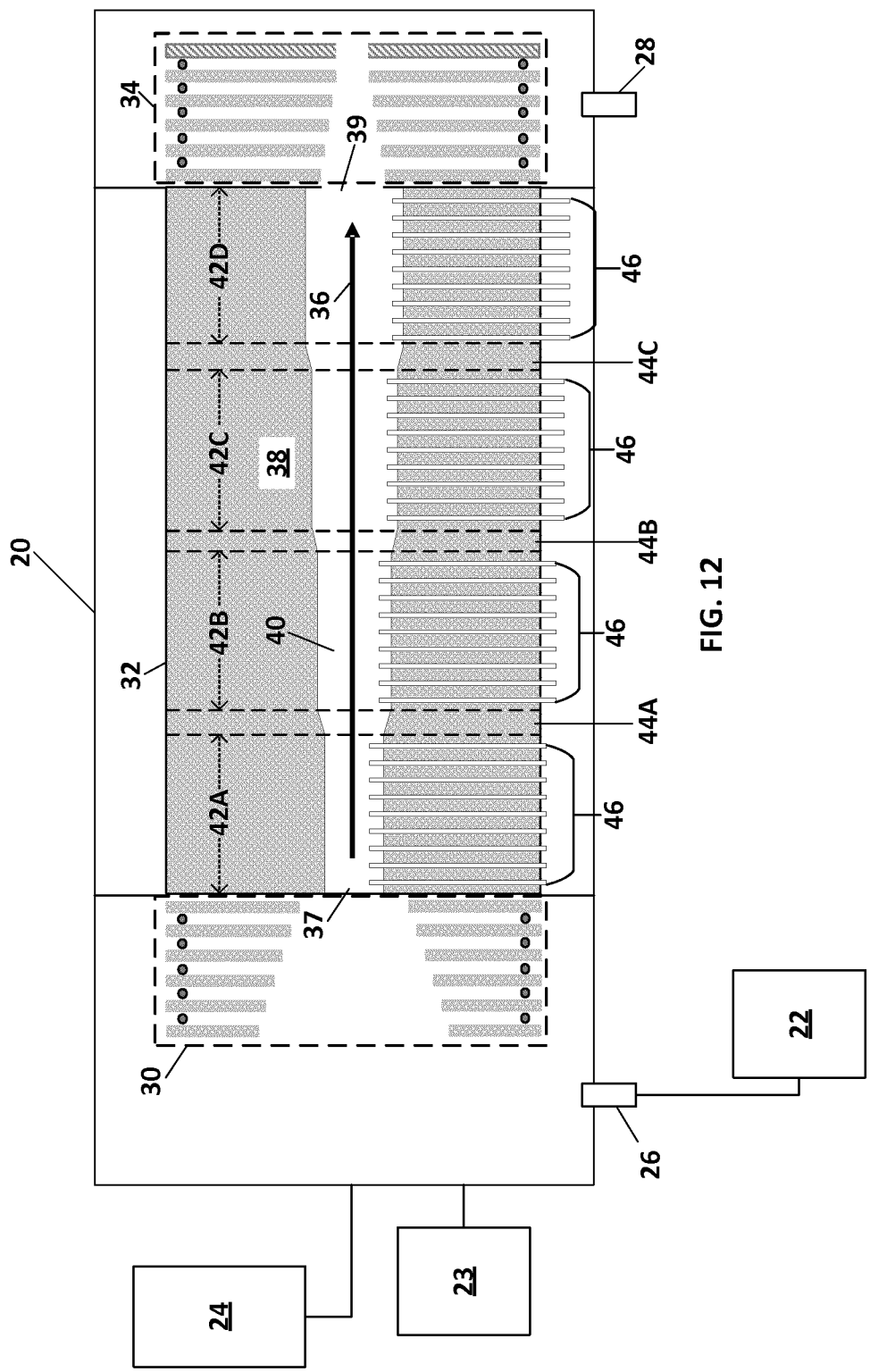
FIG. 12 shows another embodiment of the IMS of the present disclosure.

FIG. 12 shows another embodiment of an IMS 20 in accordance with the present disclosure. The embodiment of the IMS 20 of FIG. 12 is similar to the embodiment shown in FIG. 1, except that the orientation of the ion channel 40 in FIG. 12 is opposite from the one in FIG. 1.

Figure 13:
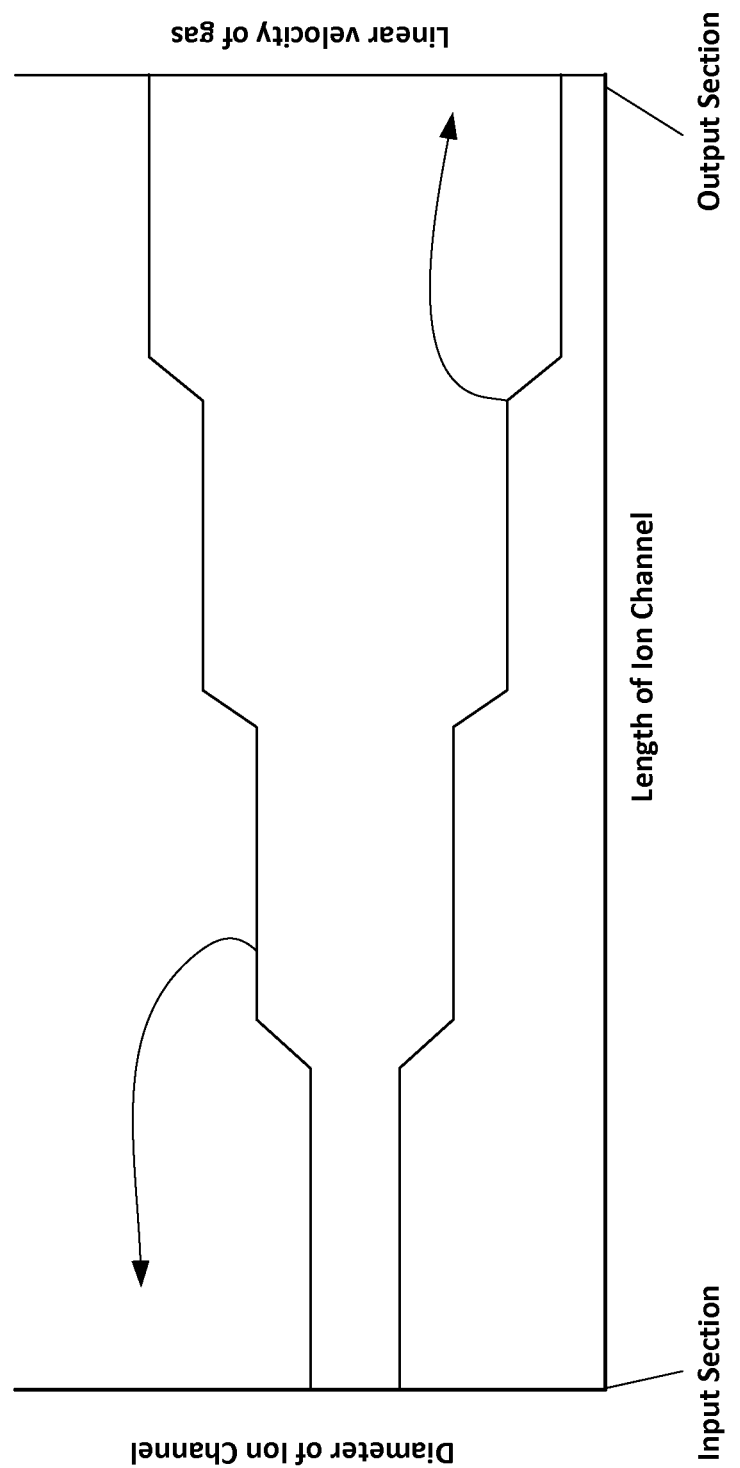
FIG. 13 shows a plot of the diameter of the ion channel of the IMS of FIG. 12, as a function of the length of the ion channel.

FIG. 13 shows an example of a plot of the diameter of the ion channel 40 as a function of the length of the ion channel 40 for the embodiment of FIG. 13. In every lengthwise portion of the ion channel, the diameter is either constant or increasing, which is akin to a monotonic increasing function. As such, the ion channel 40 has a diameter that varies monotonically along the ion channel 40. FIG. 13 also show a plot of the linear velocity of the flowing gas in each segment of the ion channel.

Figure 14:
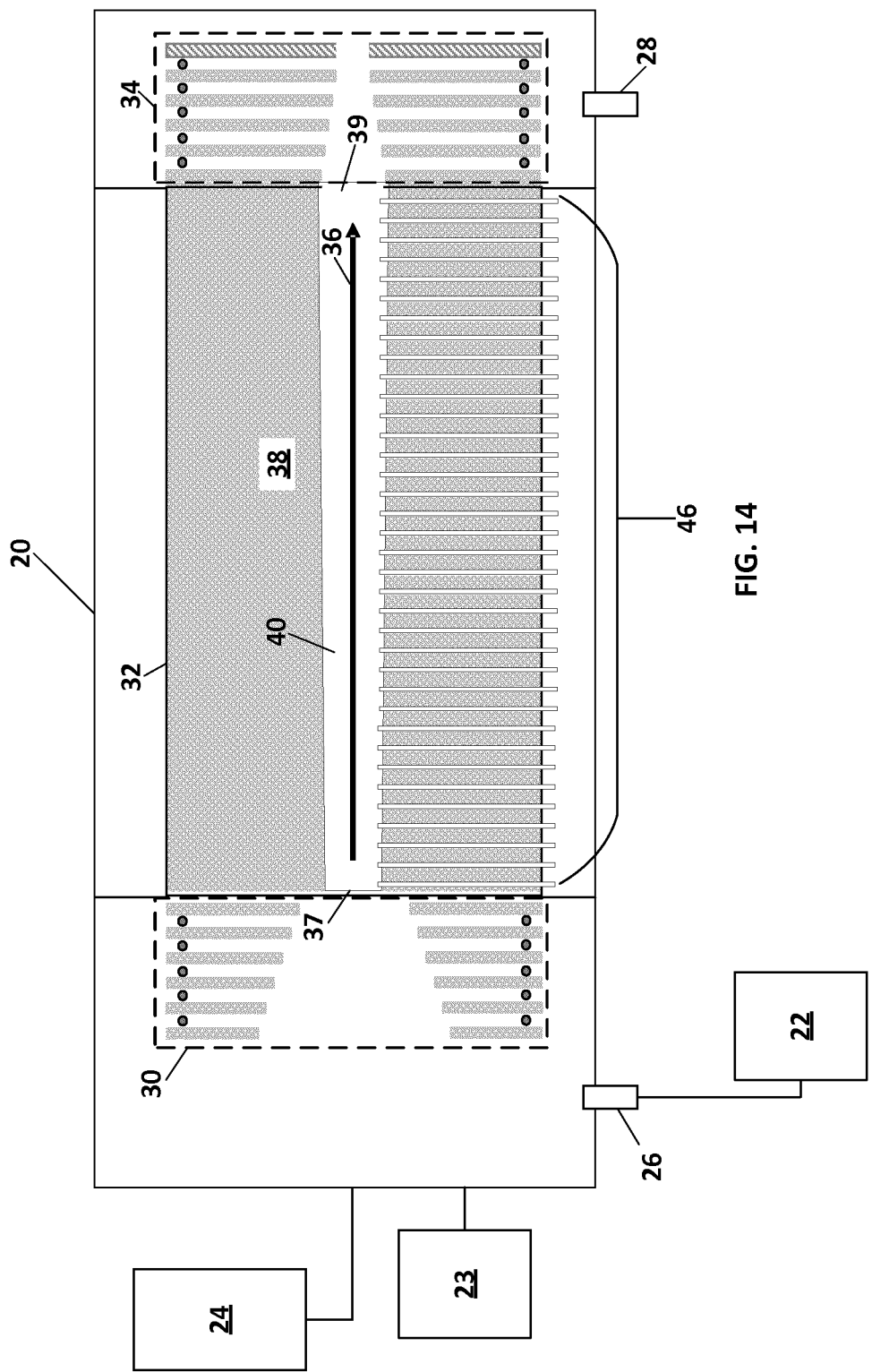
FIG. 14 shows a further embodiment of the IMS of the present disclosure.

FIG. 14 shows another embodiment of an IMS 20 in accordance with the present disclosure. The embodiment of the IMS 20 of FIG. 14 is similar to the embodiment shown in FIG. 1, except that the ion channel 40, rather than having segments of constant diameter, has an ion channel 40 that that is continuously slopped.

Figure 15:
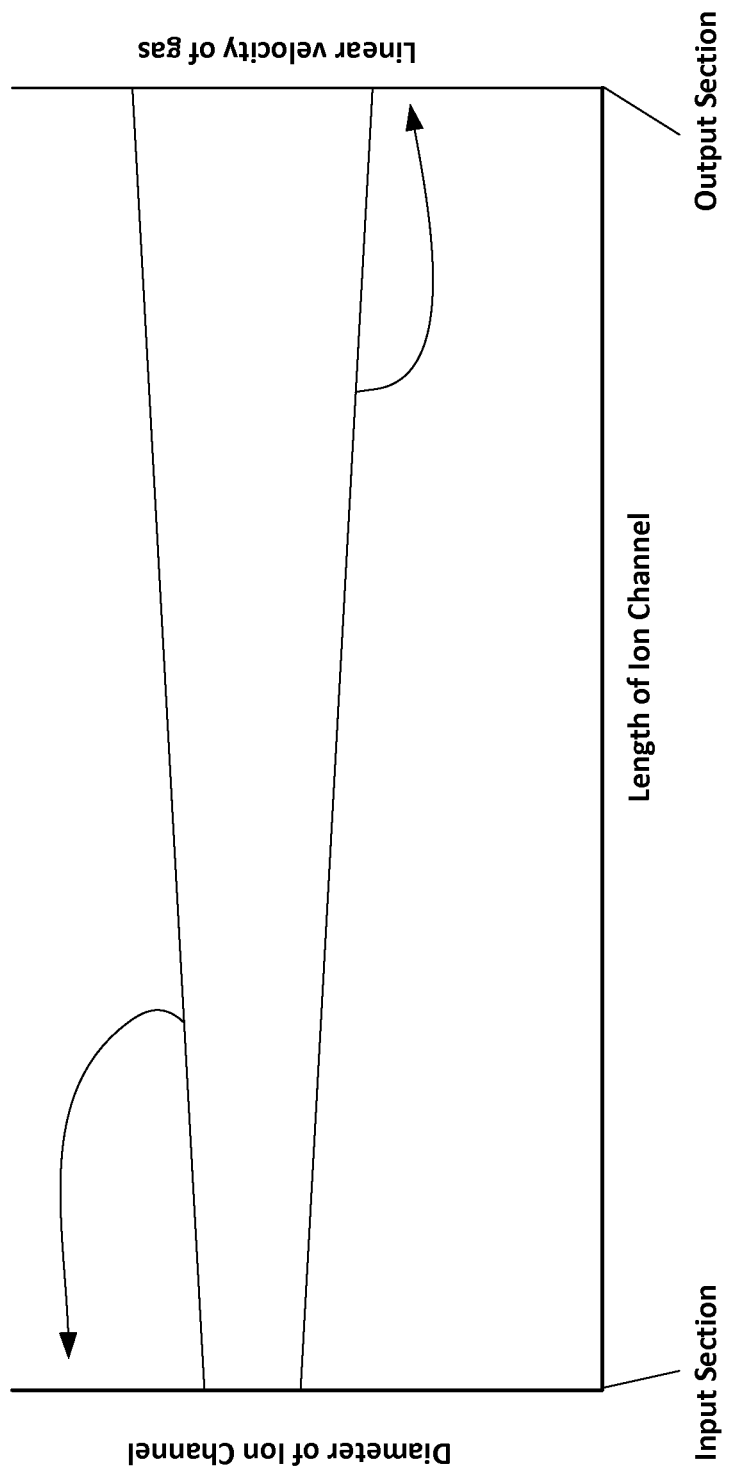
FIG. 15 shows a plot of the diameter of the ion channel of the IMS of FIG. 14, as a function of the length of the ion channel.

FIG. 15 shows an example of a plot of the diameter of the ion channel 40 as a function of the length of the ion channel 40 for the embodiment of FIG. 14. All along the ion channel 40, the diameter of the channel increases, which is akin to a monotonic increasing function. As such, the ion channel 40 has a diameter that varies monotonically along the ion channel 40. FIG. 15 also show a plot of the linear velocity of the flowing gas in the ion channel.

Figure 16:
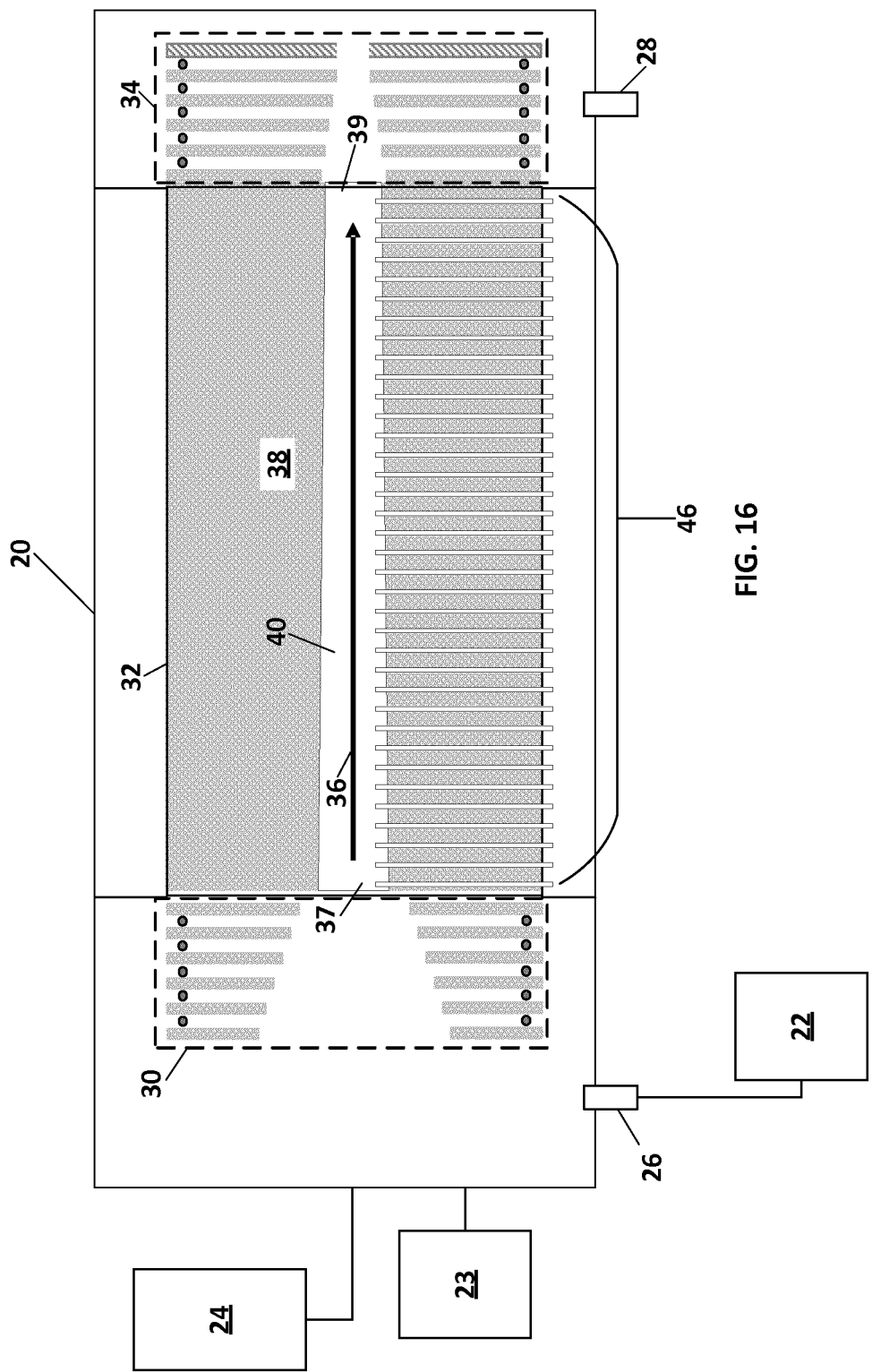
FIG. 16 shows an additional embodiment of the IMS of the present disclosure.

FIG. 16 shows another embodiment of an IMS 20 in accordance with the present disclosure. The embodiment of the IMS 20 of FIG. 16 is similar to the embodiment shown in FIG. 14, except that the diameter of the ion channel 40 is larger at the input section 37 than at the output section 39.

Figure 17:
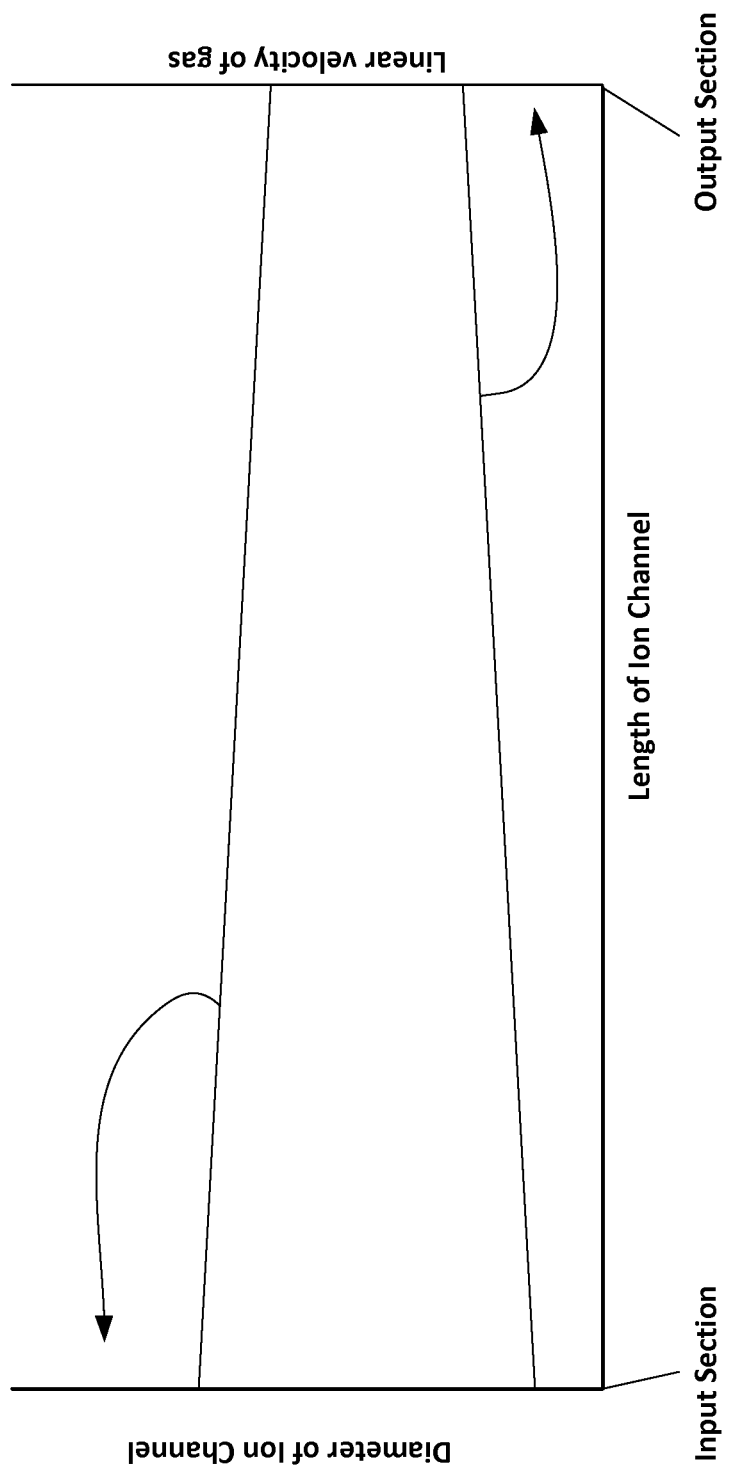
FIG. 17 shows a plot of the diameter of the ion channel of the IMS of FIG. 14, as a function of the length of the ion channel.

FIG. 17 shows an example of a plot of the diameter of the ion channel 40 as a function of the length of the ion channel 40 for the embodiment of FIG. 16. All along the ion channel 40, the diameter of the channel decreases, which is akin to a monotonic increasing function. As such, the ion channel 40 has a diameter that varies monotonically along the ion channel 40. FIG. 15 also show a plot of the linear velocity of the flowing gas in the ion channel.

In the embodiments of FIGS. 14 and 16, the diameter of the ion channel 40 varies linearly from the input section 37 to the output section 39. In other embodiment, the diameter of the ion channel could vary quadratically or in accordance with any other suitable function, from the input section 37 to the output section 39.

In all the embodiments disclosed herein, the electrodes 46 protrude in the ion channel 40. This need not be the case. In other embodiments, instead of protruding in the ion channel 40, the electrodes 46 are flush with the wall of the ion channel 40. In yet other embodiments, the electrodes 46 protrude in the ion channel 40 but, the protruding portion of the electrodes 46 can be coated with any suitable insulator film. Any embodiment that has electrodes set in the body 38 and that produces a confining field along the central portion 41 of the ion channel 40 is within the scope of the present disclosure. The central portion 41 is shown in FIG. 1 and is centered around the central axis of the ion channel 40. The central axis is collinear with the arrow 36.

Having the electrodes 46 flush with the ion channel 40 can improve the laminar flow condition of the carrier gas. By covering the electrodes 46 with a thin insulator film, they are protected from corrosion/degradation.

In all the embodiments presented above, the ion channel 40 is described as being defined by a body 38. The body can be a monolithic body or, the body can be made of multiple parts secured together to define the ion channel. Such a body can be referred to as a composite body. Depending on the embodiments, the body 38 can be made of an electrically insulating material or of conductive material.

Preferably, the electrodes 46 are highly conductive and relatively inert. Gold or stainless steel are two options of material that can be used for the electrodes 46.

When the electrodes 46 set in the body 38 are not separated from the body with an electrical insulator, the material used for the body 38 is an electrically insulating material such as, for example, a plastics (PEEK, PTFE, etc.) or machinable ceramics (for example, Macor™) are suitable.

When the material of body 38 is made of an insulator material, DC and time-varying electric fields can be applied by using the electrodes 46 set in the body 38 as showed in the embodiment of FIG. 1. Alternatively, the body of the ion channel can be made of conductive material of high resistivity. In such embodiments, passing DC current through the body 38 will produce a DC voltage gradient along the ion channel 40. The shape of the DC electric field along the channel will correspond to the resistance along the body of the ion channel 40. The AC field can be introduced by embedded electrically isolated electrodes in the body of the ion channel or it can be introduced via an external RF induction circuit coupled to the analyzer 34 and to the ion channel 40. The latter approach can be better when attempting to generate an RF field in the ion channel of a miniature analyzer produced by 3D printing.

Figure 18:
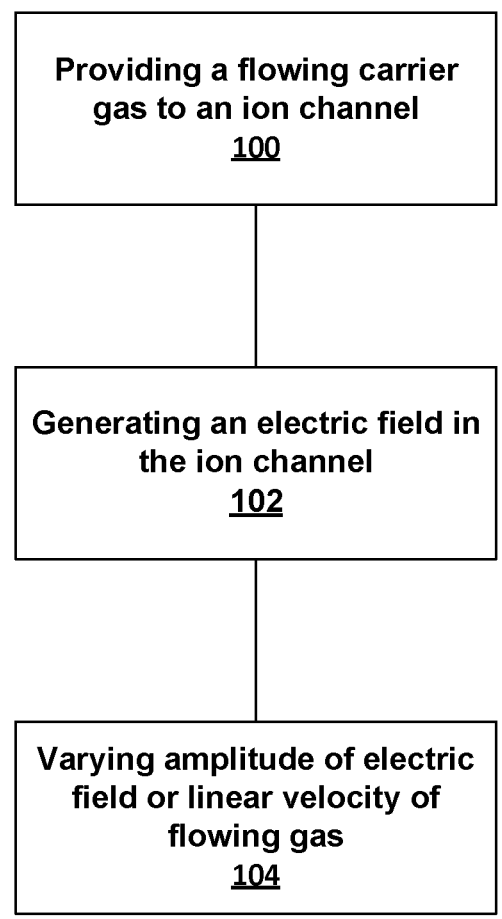
FIG. 18 shows a flowchart of an embodiment of a method in accordance with the present disclosure.

FIG. 18 shows a flowchart of a method of analyzing ions in accordance with the present disclosure. At step 100, a flowing carrier gas is provided to an ion channel. The ion channel has an input section and an output section and the flowing carrier gas is input at the input section. The flowing carrier gas containing the ions. The ion channel has a plurality of segments parallel to the ion channel and a speed of the flowing carrier gas is constant within each segment but, the speed of the flowing carrier gas in a particular segment is different than the speed of the flowing carrier gas in any other segment of the ion channel. The speed of the flowing carrier gas changes monotonically along the ion channel. The flowing carrier gas generates a drag force on the ions and the drag force depends on the speed of the flowing carrier gas. Examples of such an ion channel are shown at FIGS. 1, 12, 14 and 16.

Returning to FIG. 18, at step 102, an electric field is generated in the ion channel to produce an electric force acting on the ions. The field is such that the electric force is in a direction opposite the direction of the drag force. The different speed of the flowing carrier gas in each segment of the ion channel and the electric force result is a separation of the ions along the ion channel.

At step 104, a variation of at least one of an amplitude of the electric field and the speed of the carrier gas in each linear segment of the ion channel is effected in order to eject ions from the output section of the ion channel.

Additionally, a step of generating a time-varying electric field in the ion channel to confine the ions to a central region of the ion channel can be performed. Further, ions can be accumulated ions in the ion channel prior to varying at least one of an amplitude of the electric field and the speed of the carrier gas in each segment of the ion channel.

Further, the ejected ions can be provided to an ion characterization device. For example, a mass spectrometer.

Furthermore, in some embodiments of the method, the form of the ion channel can be such that the speed of the flowing carrier gas is greater in a segment of the plurality of segments closest to the output section than the speed of the flowing carrier gas in a segment of the plurality of segments closest to the input section.

As detailed above, the present disclosure provides an ion mass spectrometer that has an ion channel shaped to modify the speed of a carrier gas as the carrier gas traverses the ion channel. In one case, the ion channel has segments of constant diameter in which the speed of the flowing gas is constant but different than the speed in other segments of the ion channel. The controlled variation in speed from segment to segment, together with the control of the axial electric field in the ion channel, provide greater control on the separation of ions in the ion channel.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. An ion mobility spectrometer comprising:
an ion mobility analyzer, the analyzer having:
a body defining an ion channel extending therethrough, the ion channel being continuous along an entire length of the ion channel, the ion channel having a diameter that varies monotonically along the entire length of the ion channel, the ion channel having an input section and an output section;
electrodes set in the body, along the ion channel and around the ion channel, the electrodes being arranged to receive an adjustable DC electrical signal and an adjustable time-varying electrical signal, the adjustable DC electrical signal to generate an electric field along the ion channel, the time-varying electrical signal to generate a confining field to confine ions in the ion channel along a central portion of the ion channel, the central portion extending parallel to the ion channel;
an entrance guide, distinct from the ion mobility analyzer, coupled to the input section of the ion channel, the entrance guide being funnel shaped and comprising a plurality of ring segments concentrically aligned with each other, the entrance guide configured to guide ions to the ion channel; and
an exit guide, distinct from the ion mobility analyzer, coupled to the output section of the ion channel, the exit guide to guide ions exiting the analyzer out of the ion mobility spectrometer.

2. The ion mobility spectrometer of claim 1, wherein the electrodes protrude in the ion channel, or the electrodes are flush with the ion channel.

3. The ion mobility spectrometer of claim 1, wherein the diameter of the ion channel decreases continuously from the input section to the output section.

4. The ion mobility spectrometer of claim 3, wherein the diameter of the ion channel decreases linearly from the input section to the output section.

5. The ion mobility spectrometer of claim 3, wherein the diameter of the ion channel decreases quadratically from the input section to the output section.

6. The ion mobility spectrometer of claim 1, wherein the diameter of the ion channel decreases continuously from the output section to the input section.

7. The ion mobility spectrometer of claim 6, wherein the diameter of the ion channel decreases linearly from the output section to the input section, or the diameter of the ion channel decreases quadratically from the output section to the input section.

8. The ion mobility spectrometer of claim 1, wherein the ion channel includes a plurality of segments each having a respective constant diameter different from the diameter of the other segments of the plurality of segments.

9. The ion mobility spectrometer of claim 8, wherein the ion channel includes one or more than one transition section, each segment of the plurality of segments is spaced apart from another segment of the plurality of segments by a respective one of the one or more than one transition section.

10. The ion mobility spectrometer of claim 9, wherein each transition section of the one or more than one transition section has a length parallel to the ion channel and a diameter that varies along the length of respective transition section.

11. The ion mobility spectrometer of claim 1, wherein the electrodes are perpendicular to the ion channel and are radially aligned with the ion channel.

12. The ion mobility spectrometer of claim 1, wherein the electrodes comprise groups of electrodes, each group of electrodes being in a respective plane that is perpendicular to the ion channel, each group of electrodes being spaced apart from the other groups of electrodes, along the ion channel.

13. The ion spectrometer of claim 12, wherein each group of electrodes consists of an even number of electrodes.

14. The ion spectrometer of claim 1, wherein the time-varying electrical signal is a radio frequency (RF) electrical signal.

15. The ion spectrometer of claim 14, wherein the RF electrical signal is a multipole RF signal.

16. The ion spectrometer of claim 1, wherein:
the entrance guide is configured to receive a flowing carrier gas and to provide the flowing carrier gas to the ion channel; and
the monotonically varying diameter of the ion channel is configured to vary a speed of the flowing carrier gas as the flowing carrier gas traverses the ion channel.

17. The ion spectrometer of claim 16, further comprising one of:
i) a source of carrier gas providing the flowing carrier gas;
ii) a source of reagent carrier gas providing the flowing carrier gas; and
iii) a source of carrier gas providing the flowing carrier gas and a source of reagent compound configured to provide a reagent compound for mixing with the flowing carrier gas.

18. The ion mobility spectrometer of claim 1, wherein the body is made of electrically insulating material.

19. The ion spectrometer of claim 1 further comprising an electrical signal source coupled to the electrodes, the electrical signal source being configured to generate, in distinct linear segments of the ion channel, distinct DC electric fields.

* * * * *